United States Patent
Bhatia et al.

(10) Patent No.: US 12,309,533 B2
(45) Date of Patent: May 20, 2025

(54) INTELLIGENT SURVEILLANCE CAMERA CONTROL AND NOTIFICATION SYSTEM

(71) Applicants: Surbhi Bhatia, Al-Hofuf (SA); Ali Alqahtani, Najran (SA); Nayef Alqahtani, Al-Hofuf (SA); Sultan AlYami, Najran (SA); Jarallah Alqahtani, Najran (SA)

(72) Inventors: Surbhi Bhatia, Al-Hofuf (SA); Ali Alqahtani, Najran (SA); Nayef Alqahtani, Al-Hofuf (SA); Sultan AlYami, Najran (SA); Jarallah Alqahtani, Najran (SA)

( * ) Notice: Subject to any disclaimer, the term of this patent is extended or adjusted under 35 U.S.C. 154(b) by 119 days.

(21) Appl. No.: 18/150,382

(22) Filed: Jan. 5, 2023

(65) Prior Publication Data

US 2023/0156160 A1  May 18, 2023

(51) Int. Cl.
| | | |
|---|---|---|
| *H04N 7/18* | (2006.01) | |
| *G06V 20/52* | (2022.01) | |
| *H04N 23/695* | (2023.01) | |
| *H04N 5/77* | (2006.01) | |
| *H04N 23/20* | (2023.01) | |

(52) U.S. Cl.
CPC ............ *H04N 7/181* (2013.01); *G06V 20/52* (2022.01); *H04N 23/695* (2023.01); *G06V 2201/05* (2022.01); *H04N 5/77* (2013.01); *H04N 23/20* (2023.01)

(58) Field of Classification Search
None
See application file for complete search history.

(56) References Cited

U.S. PATENT DOCUMENTS

| | | | | |
|---|---|---|---|---|
| 5,497,188 | A * | 3/1996 | Kaye ..................... | H04N 7/185 348/36 |
| 9,686,452 | B2 * | 6/2017 | Jones ..................... | G09B 5/08 |
| 10,242,501 | B1 * | 3/2019 | Pusch ................... | H04N 21/44218 |
| 11,783,635 | B2 * | 10/2023 | Zhang ................... | G06V 20/52 382/103 |
| 2016/0309176 | A1 * | 10/2016 | Talayssat ............... | G06V 10/446 |
| 2019/0392588 | A1 * | 12/2019 | Far ........................ | G08B 21/18 |
| 2020/0368616 | A1 * | 11/2020 | Delamont .............. | H04N 13/239 |
| 2020/0405148 | A1 * | 12/2020 | Tran ...................... | A61B 3/0016 |
| 2021/0008413 | A1 * | 1/2021 | Asikainen .............. | G06F 3/0304 |

(Continued)

*Primary Examiner* — Mohammad J Rahman
(74) *Attorney, Agent, or Firm* — Perilla Knox & Hildebrandt LLP; Kenneth A. Knox

(57) ABSTRACT

The present disclosure relates to an Intelligent Surveillance Camera Control and Notification System. The system comprises: a plurality of camcorders; an infrared sensor coupled with each camera; a controlling unit; and an alert unit. The aim of the present disclosure is to provide a framework that can detect weapon for safety and security of public. The proposed invention manages the planning and execution of a clever observation checking framework utilizing a Raspberry Pi and a PIR sensor for cell phones. The proposed framework collects data and transmits it via a 3G Dongle to a PDA via a web application. Raspberry Pi operates and controls movement finders and camcorders for remote detection and reconnaissance, as well as transfers live video and records it for later playback. The proposed invention is advantageous because it provides dependability and security on both sides.

4 Claims, 4 Drawing Sheets

(56) References Cited

U.S. PATENT DOCUMENTS

| | | | |
|---|---|---|---|
| 2022/0103727 A1* | 3/2022 | Kei | G03B 17/12 |
| 2023/0177811 A1* | 6/2023 | Nadler | G06V 20/647 |
| | | | 382/159 |
| 2023/0370579 A1* | 11/2023 | Crain | G06T 17/00 |
| 2024/0020968 A1* | 1/2024 | Haskin | G06F 16/29 |
| 2024/0153367 A1* | 5/2024 | Han | H04N 7/18 |
| 2024/0274015 A1* | 8/2024 | Putney | G05D 1/0295 |

* cited by examiner

INTELLIGENT SURVEILLANCE CAMERA CONTROL AND NOTIFICATION SYSTEM

TECHNICAL FIELD

The present disclosure relates to an intelligent surveillance system. More particularly, the present disclosure relates to an Intelligent Surveillance Camera Control and Notification System.

BACKGROUND

It is necessary to work on various security methods because of the increase in crime rates that can be attributed to the total populace and joblessness proportion.

The traditional policing approach focuses on responding to incidents such as theft, robbery, and assault by conducting investigations. However, these responsive efforts are not sufficient to prevent violent incidents from occurring. In the modern era, technology has become an integral part of public and personal safety.

In a prior art, a system is proposed that controls a network of surveillance cameras based on user-defined rules. The system can be configured to detect specific events, such as a person entering a restricted area, and can trigger an alert or take other predetermined actions in response.

In another prior art, a system is proposed that automatically pan and tilt a surveillance camera to track a moving object. The system uses image recognition algorithms to identify the object and then moves the camera to keep it in view.

In another prior art, a system is proposed that integrates surveillance cameras with other sensors, such as motion detectors and door sensors, to provide a more comprehensive view of a monitored area. The system can be configured to send alerts or take other actions based on the inputs from the various sensors.

Closed circuit television (CCTV) camera-based surveillance and control systems are used to monitor incidents worldwide. However, identifying events requires human personnel. This human-based continuous monitoring in surveillance camera systems is error-prone because it is not humanly possible to constantly monitor the surveillance area minutely. Although human intervention can identify unusual activities, they can make mistakes while monitoring for a long time. Without automated surveillance, there is a high likelihood that the system can make mistakes in detection. To reduce the errors, the surveillance system should be automated. Thus there is a need of an automated system for camera surveillance.

In the view of the foregoing discussion, it is clearly portrayed that there is a need of an Intelligent Surveillance Camera Control and Notification System.

BRIEF SUMMARY

The present disclosure relates to an Intelligent Surveillance Camera Control and Notification System. The proposed system is a framework for weapon detection for public safety and security, wherein this system helps in proactive safety efforts. This present disclosure manages the planning and execution of an intelligent observation checking framework utilizing a Raspberry Pi and a PIR sensor for cell phones. It broadens the use of versatile innovation to provide fundamental home security and other control applications. The proposed home security framework collects data and transmits it to a PDA via a 3G Dongle via a web application. Raspberry Pi operates and controls movement finders and camcorders for remote detection and reconnaissance, as well as transfers live video and records it for later playback. With the help of the infrared sensor, it can also determine the number of people present. For example, when movement is detected, the cameras begin recording, and the Raspberry Pi device alerts the owner of the potential interruption using a PDA. Raspberry—Pi has two main parts that communicate with one another: the Internet Application, which runs on the phone's program, and server—side scripts, which create a cloud that will be worked by the Raspberry Pi Equipment instrument part. As a result, we devised a clever reconnaissance framework capable of recording/capturing video/pictures and transmitting them to a PDA. It is advantageous because it provides dependability and security on both sides. It is validated and encoded on the receiver side, so it only allows the individual concerned to see the nuances. Necessary moves can be made in limited capacity to focus time on account of crisis conditions, for example, older individuals falling ill, military regions, savvy homes, workplaces, ventures, and so on. Future work is to find the number of people found precisely on that region and their position so precise data can be obtained on the recipient side.

The present disclosure seeks to provide an Intelligent Surveillance Camera Control and Notification System. The system comprises: a plurality of camcorders having a 360-degree moving mechanism for capturing real-time video/image; an infrared sensor coupled to each camera and exposed towards the focus of the camera for detecting the movement of an object and generating a movement signal; a controlling unit for controlling the direction of one or more camcorders from the plurality of camcorders towards the direction of the moving object upon receiving the generated movement signal from the, wherein the controlling unit controls movement finders and camcorders for remote detecting and reconnaissance, transfers live video and records in a cloud server; and an alert unit for alerting registered personnel or owner regarding the movement of the object upon detecting the movement of the object to avoid intrusion or any crime, wherein the alert unit sends an intrusion alert to the registered mobile numbers and activates an alarm.

In an embodiment, the camcorders consequently start recording and the controlling unit cautions the proprietor of the conceivable interruption of having a personal digital assistant (PDA), when the movement of the object is identified.

In an embodiment, the controlling unit is having at least two fundamental parts connecting with one another, wherein one is the web-based user interface that executes on the cell phone and the second is a server-side script that spat a cloud server which is operated by the controlling unit.

In an embodiment, the controlling unit comprises a classifier selected from RCNN, Quick RCNN, Quicker RCNN, and RFCN. Yolo v4 and R-FCN.

In an embodiment, the YoloV4 strategy partitions the picture into districts at first thereby the picture is sectioned into a few frameworks, otherwise called remaining blocks and every matrix is S×S in size, and the articles that exist inside every network cell is distinguished independently.

In an embodiment, the one or more camcorders from the plurality of camcorders that turn towards the moving object are the camcorders that are focused towards the moving object or within the range of its focus.

In an embodiment, an Intelligent Surveillance Camera Control and Notification System also comprise a web-based user interface for receiving the real-time video/image of the moving object remotely via the communicating device.

In an embodiment, the object is selected from a person, a vehicle, a drone, or anything that is seen by the naked eye.

An objective of the present disclosure is to provide an Intelligent Surveillance Camera Control and Notification System.

Another object of the present disclosure is to plan and execute a intelligent observation checking framework that includes Raspberry pi and PIR sensor.

Another object of the present disclosure is to provide a security framework that collects data and communicate it via a 3G dongle to a web application that uses PDA.

Another object of the present disclosure is to provide the benefits of both dependability and security on the two sides, wherein the proposed framework is validated and encoded on the receiver side, thereby offering just the individual that is worried to see the subtleties.

Yet, another object of the present disclosure is to provide an automated intelligent system that works for public safety and security.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein.

Figure 1:
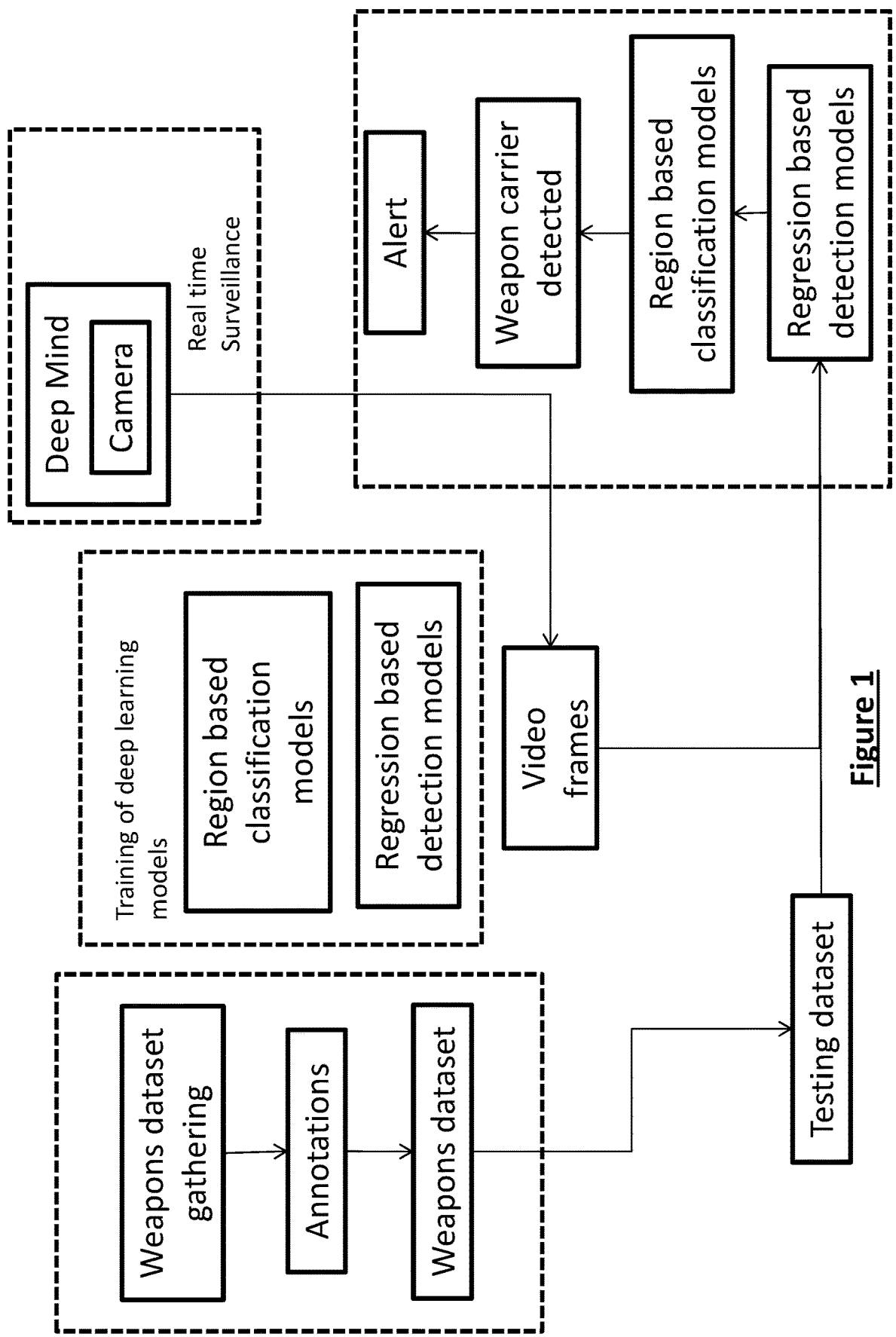
FIG. 1 illustrates real-time weapon detection in surveillance CCTV system by using a hybrid approach in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

FIG. 1 illustrates real-time weapon detection in surveillance CCTV system by using a hybrid approach in accordance with an embodiment of the present disclosure. It can be seen from the figure that the proposed framework works in four significant stages namely, (a) Collection stage for informational collection age for preparing, (b) preparation stage for preparing of the item recognition models, (c) test stage for testing of the proactive observation CCTV framework, and (d) and implementation stage for sending the model for ongoing reconnaissance.

The interaction begins with the socialization of a weapons dataset, which is then used to prepare the deep learning models. The prepared models are tested for crossover blend, and the model is then used progressively observation. The step by step working of the proposed framework is mentioned below.

1. Initially, the YoloV4 strategy divides the image into districts. The image is divided into a few frameworks, also known as remaining blocks. Every matrix is S×S in size, and each network cell's articles will be distinguished independently.

2. The Consequences be damned model purposes relapse with a single jumping box to conjecture the items' class, width, level, and focus. As a result, it envisions a constrained edge box with probability for each district. Simultaneously, it computes the probabilities of various restricted edge boxes and their classes.

3. The convergence over association, or IoU, is a concept in item recognition that depicts how the containers are covering. The IOU creates a result box to precisely encompass the things in Just go for it. Every matrix cell evaluates the bouncing boxes and their certainty scores.

If the normal and real bouncing boxes are comparable, the IOU is assigned a value of 1. This method eliminates jumping encloses that aren't the same size as the genuine box. The most recent discovery consists of exceptional jumping confines tailored to the items in question.

In an embodiment, the Yolo results are mentioned in the table given below.

| | Epochs | Precision | Recall | F1 score | Mean-avg precision (@50%) | Avg. intersection over union (@50%) |
|---|---|---|---|---|---|---|
| Yolo-v4 | 1000 | 75 | 81 | 80 | 85.23 | 56.812 |
| (Loss 0.6) | 2000 | 85 | 82 | 86 | 88.123 | 67.718 |
| | 3000 | 90 | 84 | 87 | 90.222 | 71.148 |
| Yolo-v4 (csp) | 1000 | 74 | 75 | 74 | 73.825 | 54.266 |
| Loss (6.24) | 2000 | 79 | 86 | 82 | 86.624 | 62.735 |
| | 3000 | 76 | 88 | 81 | 87.629 | 61.212 |
| Yolo-v4 (tiny) | 1000 | 56 | 54 | 55 | 54.526 | 37.569 |
| (Loss 13.6) | 2000 | 82 | 75 | 79 | 82.124 | 62.042 |
| | 3000 | 79 | 81 | 80 | 85.021 | 60.91 |

A similar report was completed for the precision and speed of relapse-based object location and locale-based order models, and a CCTV camera-based weapon identification framework was developed using the crossover approach.

The models were created using a deep learning gas pedal, and a relative report was generated using edge processing. In comparison to YOLOv4, Yolov4-CSP, and YOLOv4-minuscule, the latter is better for continuous item recognition because it has a faster derivation time; however, Yolov4 is better in accuracy and exactness for constant article location situations.

To improve the precision of the introduced framework, an RFCN-based prepared model is added before the alert generation stage to reduce the false positive rate. Tests have revealed that the proposed half-and-half strategy yielded somewhat positive results for proactive reconnaissance.

Figure 2:
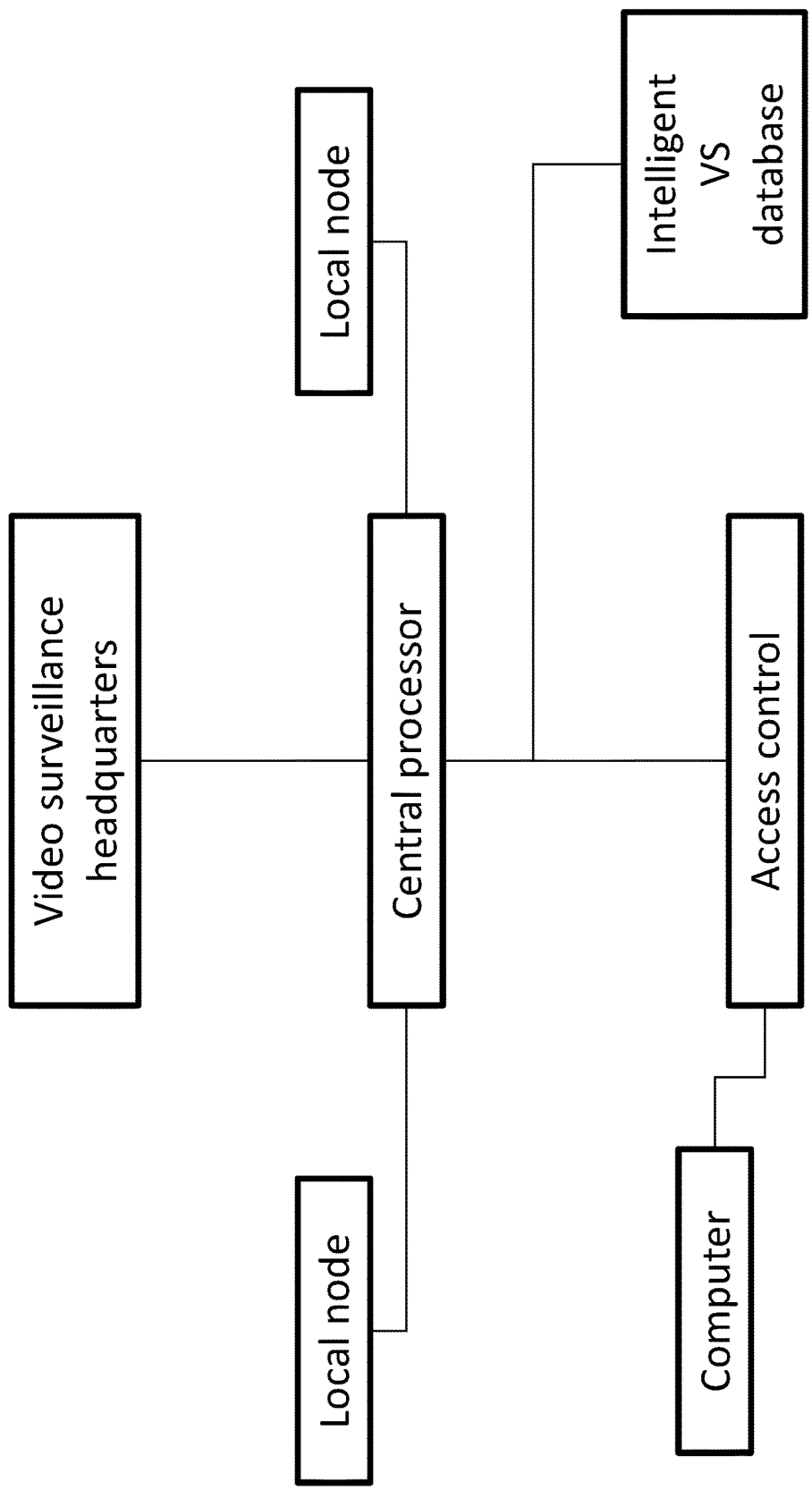
FIG. 2 illustrates intelligent surveillance camera control and notification system in accordance with an embodiment of the present disclosure.

FIG. 2 illustrates intelligent surveillance camera control and notification system in accordance with an embodiment of the present disclosure. The figure shows that the system comprises a video surveillance headquarters, plurality of local nodes, an intelligent VS database unit, an access control, and a central processor that is connected to each one of them. Furthermore the access control is connected to a computer.

Figure 3:
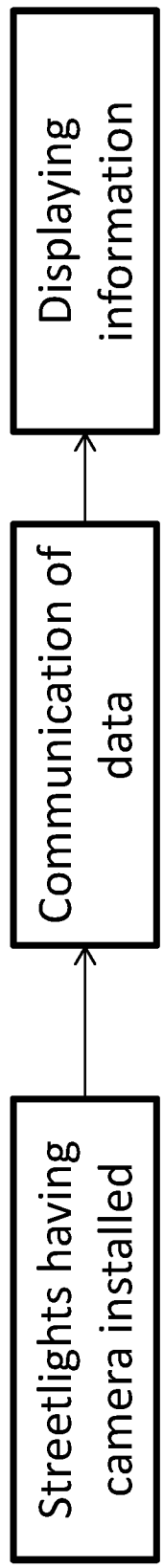
FIG. 3 illustrates an intelligent surveillance camera control and notification system complete display in accordance with an embodiment of the present disclosure.

FIG. 3 illustrates an intelligent surveillance camera control and notification system complete display in accordance with an embodiment of the present disclosure. The figures show that there are three primary parts, first is collection of data through streetlight where surveillance cameras are installed, then the data is communicated, and then information is displayed on screen in video surveillance headquarter. There are various parts that play an important role at communication parts such as public safety, municipal contractor, public access, public database, system operations, network management center, and public works.

Figure 4:
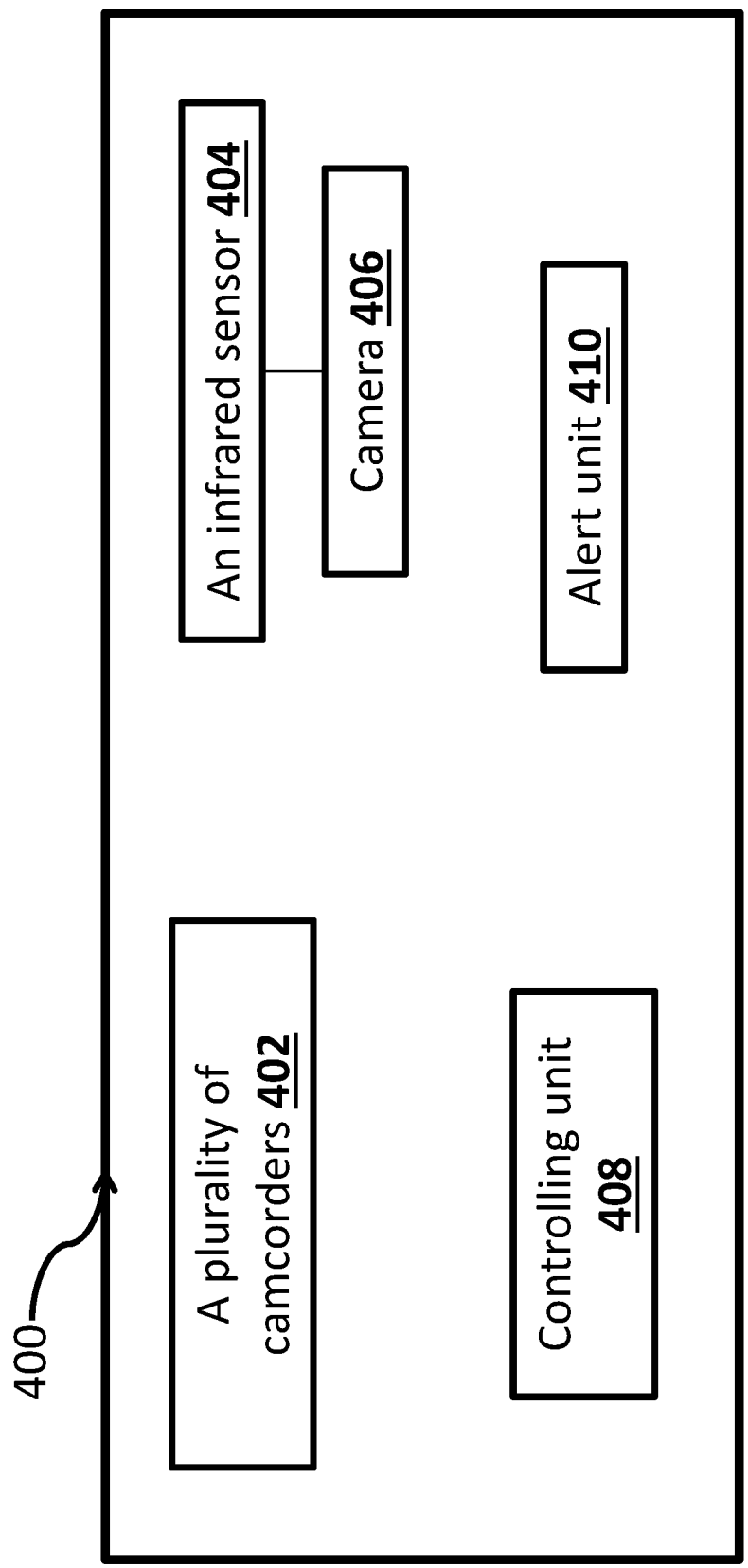
FIG. 4 illustrates a block diagram of an Intelligent Surveillance Camera Control and Notification System in accordance with an embodiment of the present disclosure.

FIG. 4 illustrates a block diagram of an Intelligent Surveillance Camera Control and Notification System (400) in accordance with an embodiment of the present disclosure. The system (400) includes a plurality of camcorders (402) having a 360-degree moving mechanism for capturing real-time video/image.

In an embodiment, an infrared sensor (404) is coupled to each camera (406) and exposed towards the focus of the camera for detecting the movement of an object and generating a movement signal.

In an embodiment, a controlling unit (408) is utilized for controlling the direction of one or more camcorders (402) from the plurality of camcorders towards the direction of the moving object upon receiving the generated movement signal from the, wherein the controlling unit (408) controls movement finders and camcorders for remote detecting and reconnaissance, transfers live video and records in a cloud server.

In an embodiment, an alert unit (410) is utilized for alerting registered personnel or owner regarding the movement of the object upon detecting the movement of the object to avoid intrusion or any crime, wherein the alert unit (410) sends an intrusion alert to the registered mobile numbers and activates an alarm.

In an embodiment, when the movement of the object is identified, the camcorders (402) consequently start recording and the controlling unit (408) cautions the proprietor of the conceivable interruption of having a personal digital assistant (PDA).

In an embodiment, the controlling unit (408) is having at least two fundamental parts connecting with one another, wherein one is the web-based user interface that executes on the cell phone and the second is a server-side script that spat a cloud server which is operated by the controlling unit.

In an embodiment, the controlling unit (408) comprises a classifier selected from RCNN, Quick RCNN, Quicker RCNN, and RFCN, Yolo v4, and R-FCN. The YoloV4 strategy partitions the picture into districts at first thereby the picture is sectioned into a few frameworks, otherwise called remaining blocks and every matrix is S×S in size, and the articles that exist inside every network cell is distinguished independently.

In an embodiment, the one or more camcorders from the plurality of camcorders that turn towards the moving object are the camcorders that are focused towards the moving object or within the range of its focus.

In an embodiment, a web-based user interface is developed for receiving the real-time video/image of the moving object remotely via the communicating device.

In an embodiment, the object is selected from a person, a vehicle, a drone, or anything that is seen by the naked eye.

In an embodiment, the investigation prepared the deep learning model for proactive observation within CCTV frameworks. Weapon information is gathered from various assets and explained the pictures for jumping encloses on weapons the view.

In an embodiment, for preparation and testing, the dataset is divided into a 70-30% proportion. For proactive observation against handheld weapons, deep learning models of relapse and order classifications are prepared using the gathered weapons dataset.

In an embodiment, the consequences would be damned v4 minuscule and Consequences be damned v4 CSP models from the relapse classification, however, the profound learning models prepared from the arrangement classification are RCNN, Quick RCNN, Quicker RCNN, and RFCN, Yolo v4, and R-FCN.

In an embodiment, the proposed disclosure is advantageous because it provides dependability and security on both sides. It is validated and encoded on the receiver side, so it only allows the individual concerned to see the nuances. Necessary moves can be made in limited capacity to focus time on account of crisis conditions, for example, older individuals becoming incapacitated, military regions, savvy homes, workplaces, ventures, and so on. Future work is to find the number of people found precisely on that region and their position so precise data can be obtained on the recipient side.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. An intelligent surveillance camera control and notification system, the system comprises:
    a plurality of camcorders having a 360-degree moving mechanism for capturing real-time videos and images;
    an infrared sensor coupled to the plurality of camcorders and exposed towards a focus of the plurality of camcorders for detecting a movement of an object and generating a movement signal;
    a controlling unit for controlling a direction of one or more camcorders from the plurality of camcorders towards a direction of a moving object upon receiving the movement signal from the infrared sensor, wherein when the movement of the object is identified, the plurality of camcorders are configured to start recording and the controlling unit cautions about conceivable interruption of having a personal digital assistant (PDA), wherein the controlling unit controls movement finders and the plurality of camcorders for remote detecting and reconnaissance, transfers live video and records in a cloud server, wherein the controlling unit comprises a web-based user interface and a server-side script connecting with each other, wherein the web-based user interface executes on a cell phone and the server-side script spats the cloud server which is operated by the controlling unit, wherein the controlling unit comprises a first classifier and a second classifier, wherein the first classifier is configured to:
    partition the images into blocks and section the blocks to remaining blocks;
    relapse with a jumping box to conjecture class, width, level, and focus of items which envision constrained edge boxes with probability for the blocks to generate bounding boxes and computes the probability of the constrained edge boxes and classes of the constrained edge boxes; and
    evaluate the bounding boxes and certainty scores of the bounding boxes, wherein if normal bounding boxes and real bounding boxes are comparable, then the first classifier is configured to assign a value of 1, which eliminates the jumping box confines tailored to the items;
    wherein the second classifier is configured to reduce a false positive rate for improving precision and proactive reconnaissance; and
    an alert unit for alerting a registered personnel regarding the movement of the object upon detecting the movement of the object to avoid intrusion and crime, wherein the alert unit sends an intrusion alert to registered mobile numbers and activates an alarm.

2. The system of claim 1, wherein a subset of the plurality of camcorders that turn towards the moving object are those focused towards the moving object or within the range of its focus.

3. The system of claim 1, wherein the web-based user interface is configured to receive the real-time video and images of the moving object remotely via a communicating device.

4. The system of claim 1, wherein the object is selected from a person, a vehicle, a drone, or an object observable by a human naked eye.

* * * * *